(12) United States Patent
Kim et al.

(10) Patent No.: US 6,892,059 B1
(45) Date of Patent: May 10, 2005

(54) CLOSED-LOOP TRANSMITTING ANTENNA DIVERSITY METHOD, BASE STATION APPARATUS AND MOBILE STATION APPARATUS THEREFOR, IN A NEXT GENERATION MOBILE TELECOMMUNICATIONS SYSTEM

(75) Inventors: Sung-jin Kim, Suwon (KR); Hyoung-woon Park, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 632 days.

(21) Appl. No.: 09/644,241

(22) Filed: Aug. 23, 2000

(30) Foreign Application Priority Data

Aug. 24, 1999 (KR) .......................................... 1999-35191

(51) Int. Cl.[7] .............................. H04B 1/06; H04B 7/00; H04B 1/69

(52) U.S. Cl. .................... 455/272; 455/275; 455/276.1; 455/277.1; 455/562.1; 375/144; 375/148

(58) Field of Search ................................ 455/272, 275, 455/276.1, 277.1, 562.1, 69; 375/267, 299, 144, 146, 148

(56) References Cited

U.S. PATENT DOCUMENTS

| | | | | | |
|---|---|---|---|---|---|
| 5,311,555 | A | * | 5/1994 | Ichiyoshi | 375/86 |
| 5,450,447 | A | * | 9/1995 | Dutta | 375/344 |
| 5,471,647 | A | | 11/1995 | Gerlach et al. | 455/63 |
| 5,634,199 | A | | 5/1997 | Gerlach et al. | 455/63 |
| 5,719,899 | A | * | 2/1998 | Thielecke et al. | 375/144 |
| 6,002,947 | A | * | 12/1999 | Smith | 455/562 |
| 6,385,181 | B1 | * | 5/2002 | Tsutsui et al. | 370/335 |

FOREIGN PATENT DOCUMENTS

| | | |
|---|---|---|
| EP | 0 807 989 A1 | 11/1997 |
| EP | 0 923 203 A3 | 6/1999 |
| EP | 0923203 | 6/1999 |
| EP | 0 923 203 A2 | 6/1999 |

* cited by examiner

*Primary Examiner*—Lee Nguyen
*Assistant Examiner*—Eugene Yun
(74) *Attorney, Agent, or Firm*—Lee, Sterba & Morse, P.C.

(57) ABSTRACT

A closed-loop transmitting antenna diversity method, and a base station and mobile station apparatus therefore in a next generation mobile telecommunications system, the closed-loop transmitting antenna diversity method having a plurality of antennas in a mobile telecommunications system, including the steps of (a) measuring the changed amount per unit time of the phase difference between antennas for each of the plurality of antennas which are used in a base station; (b) transmitting the result of measuring as feedback information for adjusting transmitting antenna diversity; (c) receiving and interpreting feedback information in the base station; (d) calculating the weighted value of array antennas for each antenna, using the interpreted feedback information; and (e) multiplying data which is to be transmitted from the base station to a mobile station by the array antenna weighted value, and outputting the result through a corresponding antenna. Here, the changed amount per unit time of the phase difference between antennas is obtained by subtracting the previous phase difference between antennas which the base station knows from the phase difference between antennas which is calculated by a current mobile station.

17 Claims, 5 Drawing Sheets

CLOSED-LOOP TRANSMITTING ANTENNA DIVERSITY METHOD, BASE STATION APPARATUS AND MOBILE STATION APPARATUS THEREFOR, IN A NEXT GENERATION MOBILE TELECOMMUNICATIONS SYSTEM

BACKGROUND OF THE INVENTION

1. Field of the Invention

The present invention relates to transmission antenna diversity. More specifically, the invention relates to a closed-loop transmission antenna diversity method, and a base station apparatus and a mobile station apparatus therefor, in a next generation mobile telecommunications system.

2. Description of the Related Art

A third generation mobile telecommunications system has a standard for higher-speed transmission of data than the previous, second generation mobile telecommunications system. The second generation mobile telecommunications system is represented by personal communication systems (PCS).

As a wireless connection specification, the W-CDMA method, an asynchronous method, is being standardized in Europe and Japan. Concurrently, the IS-2000 CDMA method, a synchronous method, is being standardized in North America. A mobile telecommunications system is constructed in such way that a plurality of mobile stations communicate with each other through one base station.

In a mobile telecommunications system, fading can be a significant problem. Fading reduces the amplitude of a received signal by a few decibels (dB) to tens of decibels. In order to transmit high-speed data, fading must be sufficiently overcome. A variety of diversity technologies are used to overcome fading. The CDMA method adopts a rake, which receives signals in diversity reception using the delay spread of a channel. The rake is a multipath diversity technology. A deficiency of this technology is that it does not operate when the delay spread is small. Time diversity technology, which uses interleaving and coding, is used in a Doppler spread channel. It is difficult to use this time diversity technology in a low-speed Doppler channel.

A space diversity method is used in order to overcome fading in an indoor channel, which has small delay spread, and in a pedestrian channel, which is a low-speed Doppler channel. The space diversity method uses two or more antennas. When a signal received in one antenna is attenuated by fading, the other antenna is used for receiving the signal. Space method antenna diversity is divided into receiving antenna diversity, which uses receiving antennas, and transmitting antenna diversity, which uses transmitting antennas. Since it is difficult to install receiving antenna diversity in a terminal from the aspects of space and cost, use of transmitting antenna diversity in a base station is recommended.

In addition, transmitting antenna diversity is divided into closed-loop transmission diversity, in which uplink channel information is fed back from a terminal, and open-loop transmission diversity, which has no feedback operation. The closed-loop transmission diversity has twice the gain of open-loop transmission diversity in the aspect of signal-to-noise and interference ratio (SNIR). However, the closed-loop transmission diversity, which operates by feeding channel information back, has a shortcoming in that it is greatly affected by the feedback cycle. When a feedback cycle is long, performance is lowered because a channel changes before feedback information arrives at a terminal. When a lot of information per unit time is fed back in order to trace a rapidly-changing channel, the capacity for uplinking is lowered. Therefore, when a channel changes rapidly due to a high Doppler frequency, it is more helpful to performance improvement to quickly transmit minimum necessary information than to transmit detailed information on a channel.

Additionally, according to a diversity combination mode, transmitting antenna diversity is divided into a maximal ratio combination (MRC) mode, an equal gain combination (EGC) mode, and a selective combination (SC) mode. The EGC mode is a little lower in performance compared to the MRC mode, but is widely used because the peak-to-average ratio (PAR) of the EGC mode is lower. The MRC mode, of which the PAR is higher, raises the cost of a transmission power amplifier in a CDMA base station.

Figure 1:
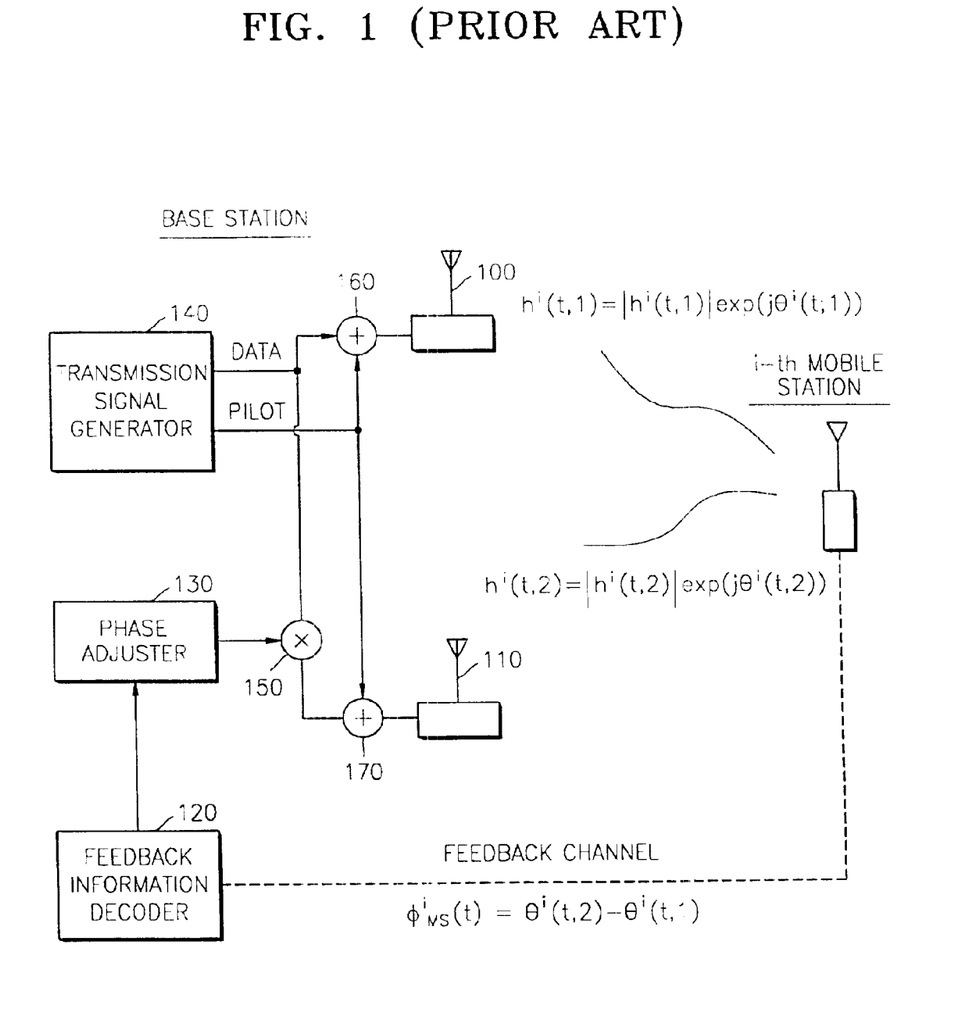
FIG. 1 is a block diagram showing the organization of a base station using a general transmission antenna diversity method operating in an equal gain mode for coherent combination, as known in the prior art.

FIG. 1 is a block diagram showing the organization of a base station using a general transmission antenna diversity method operating in an equal gain mode for coherent combination, as known in the prior art.

Referring now to FIG. 1, an i-th mobile station obtains the phase difference between antennas by measuring information on two separate channels transmitted by two transmitting antennas 100 and 110 of a base station, and feeds the phase difference back to the base station. The base station decodes the phase difference, which is feedback information, through a feedback information decoder 120, and phase-compensates the decoded result through a phase adjuster 130. A data signal, which is generated in a transmission signal generator 140, is transmitted together with a first pilot signal through the first antenna 100, and the same data signal weighted with the phase-compensated phase difference, is transmitted together with a second pilot signal through the second antenna 110. The apparatus of FIG. 1 also includes a multiplier 150 and a first and a second adder 160 and 170, respectively.

Two United States patents, U.S. Pat. No. 5,634,199, entitled "Method of Subspace Beamforming Using Adaptive Transmitting Antennas with Feedback" and issued to Derek Gerlach, Columbus, Ohio; Arogyaswami Paulraj, Stanford, Calif.; and Gregory G. Raleigh, El Grannanda, Calif., on May 27, 1997 and U.S. Pat. No. 5,471,647, entitled "Method for Minimizing Cross-talk in Adaptive Transmission Antennas" and issued to Derek Gerlach, Los Altos Hills, Calif.; and Arogyaswami Paulraj, Stanford, Calif. relate to transmitting antenna diversity methods. The former patent is assigned to Stanford University, CA, U.S.A., and the latter patent is assigned to The Leland Stanford Junior University, CA, U.S.A. Both patents use transmit-diversity in a feedback mode.

These patents propose channel measuring and feedback methods using a perturbation algorithm and a gain matrix. These methods are not optimal methods for efficiently processing channel information.

In the meantime, another method has been proposed in which channel information is efficiently quantized and fed back, as also depicted in FIG. 1. Specifically, when transmission diversity, which operates in an equal gain mode, is used, the phase difference with a base antenna is quantized by two-bit information $\{0, \pi/2, \pi, -\pi/2\}$ or one-bit information $\{0, \pi\}$.

The equal gain mode is a diversity combination method in which when destructive interference occurs due to the phase difference of two transmitting antenna channels, phases of diversity antennas are compensated in advance with the phase of a base antenna so that a signal received through each antenna channel has the co-phase. The phase difference with a base antenna is obtained by subtracting the phase of a first antenna channel, that is, a base antenna channel, from the phase of a k-th antenna channel.

The two-bit information equal gain mode optimally quantized channels, but still more reduction in bits is needed in order to satisfy rapidly changing channels. Quantizing in one-bit causes the loss of a lot of information, and therefore, is inferior to the two-bit mode, except for high-speed transmission. A method for feeding back two-bit information with a faster cycle has been proposed, but this method has a shortcoming of greatly reduced uplink capacity.

SUMMARY OF THE INVENTION

In order to solve at least some of the above-described problems, it is a feature of the present invention to provide a closed-loop transmitting antenna diversity method for effectively improving the performance of downlinking and uplinking by transmitting a changed amount per unit time of the phase difference between antennas as feedback information, when a plurality of antennas are used. The performance of downlinking and uplinking is perhaps the most important feature of the next-generation telecommunications system.

It is another feature of the present invention to provide a closed-loop transmitting antenna diversity method for effectively improving the performance of downlinking and uplinking and efficiently tracing channels, which are rapidly changing, by transmitting a changed amount per unit time of the phase difference between antennas as feedback information, particularly when two antennas are used.

It is still another feature of the present invention to provide a base station apparatus which performs the above closed-loop transmitting antenna diversity method.

It is yet another feature of the present invention to provide a mobile station apparatus which performs the above closed-loop transmitting antenna diversity method.

To provide for the first feature of the present invention, there is a closed-loop transmitting antenna diversity method wherein a plurality of antennas are used in a mobile telecommunications system, the closed-loop transmitting antenna diversity method including the steps of: (a) measuring, in a mobile station, the changed amount per unit time of the phase difference between antennas for each of the plurality of antennas which are used in a base station; (b) transmitting the results of measuring in step (a) as feedback information for adjusting transmitting antenna diversity to the base station; (c) receiving and interpreting feedback information in the base station; (d) calculating the weighted value of array antennas for each antenna, using the interpreted feedback information; and (e) multiplying data, which is to be transmitted from the base station to a mobile station, by the array antenna weighted value, and outputting the result through a corresponding antenna, wherein the changed amount per unit time of the phase difference between antennas is obtained by subtracting the previous phase difference between antenna, which the base station knows from the phase difference between antennas, which is calculated by a current mobile station.

Additionally to provide the first feature of the present invention, there is another closed-loop transmitting antenna diversity method when a plurality of antennas are used in a wireless telecommunications system, the closed-loop transmitting antenna diversity method including the steps of: (a) measuring, in a receiving station, the changed amount per unit time of the phase difference between antennas for a plurality of antennas used in a transmitting station; (b) transmitting to the transmitting station the results of measuring in step (a) as feedback information for adjusting transmitting antenna diversity; (c) receiving and interpreting in the transmitting station feedback information; (d) calculating the weighted value of array antennas for each antenna, using the interpreted feedback information; and (e) multiplying data, which is to be transmitted from the transmitting station to the receiving station, by the array antenna weighted value, and outputting the result through a corresponding antenna, wherein the changed amount per unit time of the phase difference between antennas is obtained by subtracting the previous phase difference between antennas, which the transmitting station knows, from the phase difference between antennas, which is calculated by a current receiving station.

To provide the second feature of the present invention, there is a closed-loop transmitting antenna diversity method when two antennas are used in a mobile telecommunications system, the closed-loop transmitting antenna diversity method including the steps of: (a) obtaining in a mobile station the sign of the changed amount per unit time of the phase difference between antennas for the two antennas used in a base station; (b) transmitting the sign obtained in step (a) as feedback information for adjusting transmitting antenna diversity; (c) receiving and interpreting feedback information in the base station; (d) calculating the weighted value of array antennas for each antenna, using the interpreted feedback information; and (e) multiplying data, which is to be transmitted from the base station to a mobile station, by the array antenna weighted value, and outputting the result through a corresponding antenna, wherein the changed amount per unit time of the phase difference between antennas is obtained by subtracting the previous phase difference between antennas, which the base station knows, from the phase difference between antennas, which is calculated by a current mobile station.

To provide the third feature of the present invention, there is a base station apparatus for implementing closed-loop transmitting antenna diversity, when two antennas are used in a mobile telecommunications system, the base station including: first and second antennas, one or both of which receives feedback information generated from any i-th mobile station; a feedback information decoder for interpreting the received feedback information and detecting the changed amount per unit time of the phase difference between antennas; a weighted value calculating unit for calculating the weighted value of the second antenna, using the changed amount per unit time; and a transmitting unit for transmitting a data signal and a pilot signal to the mobile station through the first antenna, and transmitting the result of multiplication through the second antenna, after multiplying the data signal by the array antenna weighted value, wherein the changed amount per unit time of the phase difference between antennas is a value obtained by adding the changed amount per unit time of the phase difference between antennas, which is measured as feedback information in the mobile station, to a feedback error due to uplink channel noise.

To provide the fourth feature of the present invention, there is a mobile station apparatus for implementing closed-loop transmitting antenna diversity when two antennas are used in a base station, the mobile station apparatus including: fingers 1 through L for conjugating each of L multipath channels, from a first multipath channel through an L-th multipath channel, of a base antenna among two antennas, and receiving each multipath pilot symbol, from a first multipath pilot symbol to an L-th multipath pilot symbol, from the base antenna; multiplier from 1 through L for multiplying the conjugated value by each corresponding pilot symbol; an adder for adding the outputs of multipliers 1 through L; an imaginary number selecting unit for selecting the imaginary part of a complex number signal which is the output from the adder; and a determining unit for determining the sign of the selected imaginary part, and outputting a signal indicating a positive value or a negative value as the feedback information.

BRIEF DESCRIPTION OF THE DRAWINGS

The above features and advantages of the present invention will become more apparent by describing in detail preferred embodiments thereof with reference to the attached drawings in which.

DETAILED DESCRIPTION OF THE PREFERRED EMBODIMENTS

Korean Patent Application No. 99-35191, filed Aug. 24, 1999, and entitled: "Closed loop transmit antenna diversity method, base station apparatus and mobile station apparatus therefor in next generation mobile communication system" is incorporated by reference herein in its entirety.

Hereinafter, embodiments of the present invention will be described in detail with reference to the attached drawings. The present invention is not restricted to the following embodiments, and many variations are possible within the spirit and scope of the present invention. The preferred embodiments of the present invention are provided in order to explain more completely the present invention to one of ordinary skill in the art.

Figure 2:
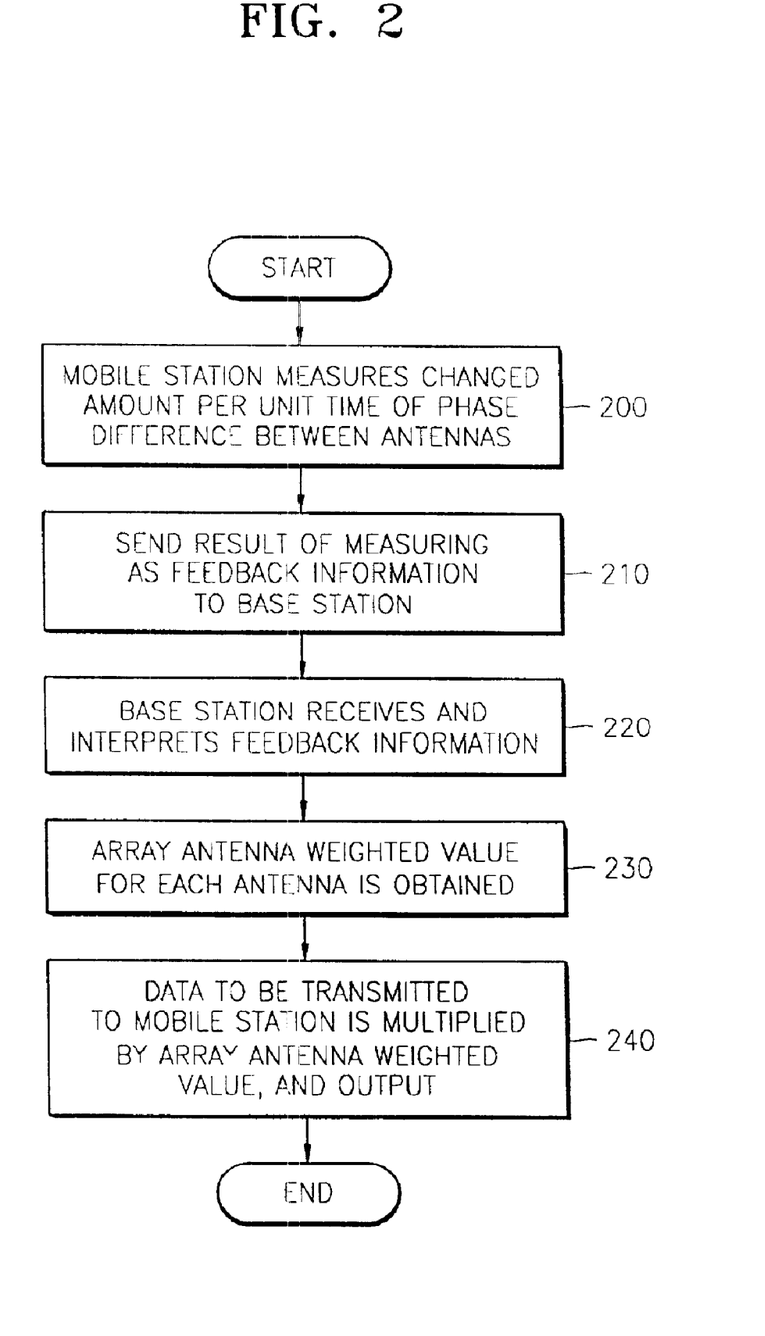
FIG. 2 is a flowchart for explaining a closed-loop transmitting antenna diversity method according to the present invention.

FIG. 2 is a flowchart for explaining a closed-loop transmitting-antenna diversity method according to the present invention.

First, a mobile station measures the changed amount per unit time of the phase difference between antennas for each of a plurality of antennas used in a base station in step 200. The mobile station transmits the measuring results to the base station as feedback information for adjusting transmitting antenna diversity in step 210.

Transmission of the results of measuring the changed amount per unit time of the phase difference between antennas as feedback information is unique to the present invention. The changed amount per unit time of the phase difference between antennas is a kind of feedback information which properly expresses the state of a channel, while keeping the amount of data to be fed back in a smaller volume. Here, the phase difference between antennas ($\phi^i_{MS}$ (t, k, k−1)=$\theta^i$ (t, k)−$\theta^i$ (t, k−1)) is the phase difference between two antennas which are spatially located closest to each other. $\theta^i$ (t, k) is the phase of a k-th antenna channel of an i-th mobile station at time t. Here, k is 2, . . . , K (k=2, . . . ,K), and K is the number of antennas used in transmission. Among a k-th antenna, a (k+1)-th antenna, . . . , a K-th antenna, any arbitrary (k−1)-th antenna is located closest to the k-th antenna. The closer the distance between two antennas is, the more similar is the channel environment the two antennas are exposed to. The phase difference between signals transmitted by these two neighboring antennas is a smaller amount of information than $\theta^i$ (t, k)−$\theta^i$ (t, 1), which corresponds to the phase difference between a k-th antenna and a base antenna, used in the previous methods.

The changed amount per unit time of the phase difference between antennas $\Delta\phi^i_{MS}(t)$ measured in step 200 is obtained by subtracting the phase difference between antennas $\phi^i_{BS}$ (t-$T_{TD-delay}$), which a base station knows, from the phase difference between antennas ($\phi^i_{MS}(t)$), which is currently measured by a mobile station. Since the changed amount per unit time ($\Delta\phi^i_{MS}(t)$) shows only the changed amount, it has a smaller amount of information than the phase difference between antennas ($\phi^i_{MS}(t)$) has. Here, i (i=1, 2, . . . , 1) is a number for distinguishing mobile station terminals, and $T_{TD-delay}$ represents the time which is required for feeding back information. Here, the phase difference which a base station knows is the value that the base station obtained when the phase difference between antennas measured by a mobile station previously is transmitted to the base station through uplink.

When a feedback error occurs, the phase difference between antennas which a base station knows does not match the phase difference between antennas which was measured at a previous time by a mobile station and fed back. At this time, $\phi^i_{BS}$ (t) is represented by $\phi^i_{BS}$ (t)=$\phi^i_{MS}$ (t)+$n^i$ (t), where $n^i$ (t) is a feedback error due to uplink channel noise.

In particular, when a base station uses a couple of antennas, the phase difference between antennas ($\phi^i_{MS}$ (t, 2, 1), hereinafter referred to as $\phi^i_{MS}$ (t)=$\theta^i$ (t, 2)−$\theta^i$ (t, 1)) is obtained by the following equation 1.

$$\phi^i_{MS}(t) = \text{angle}\{h^i(t, 2) \cdot \text{conj}(h^i(t, 1))\} \quad (1)$$

Here, $h^i(t, 1)$ and $h^i(t, 2)$ represent the first antenna channel information and the second channel information, respectively, of an i-th mobile station, and are obtained by using pilot signals which are orthogonal and commonly used in a base station. That is, channel information is measured by using a downlink pilot signal which is divided according to mobile station users.

The changed amount per unit time of the phase difference between antennas $\Delta\phi^i_{MS}(t)$ is represented by the following equation 2.

$$\Delta\phi^i_{MS}(t) = \phi^i_{MS}(t) - \phi^i_{BS}(t - T_{delay}) \quad (2)$$

Here, assuming that the value obtained by weighting the second antenna channel information by the phase difference which the base station knows is $\hat{h}^i(t,2) = h^i(t,2)\exp\{j\Phi^i_{BS}(t-T_{TD-delay})\}$, the changed amount per unit time of the phase difference between antennas is expressed as the following equation 3.

$$\Delta\Phi^i_{MS}(t) = \text{angle}\{\hat{h}^i(t,2) \text{conj}(h^i(t, 1))\} \quad (3)$$

Figure 3:
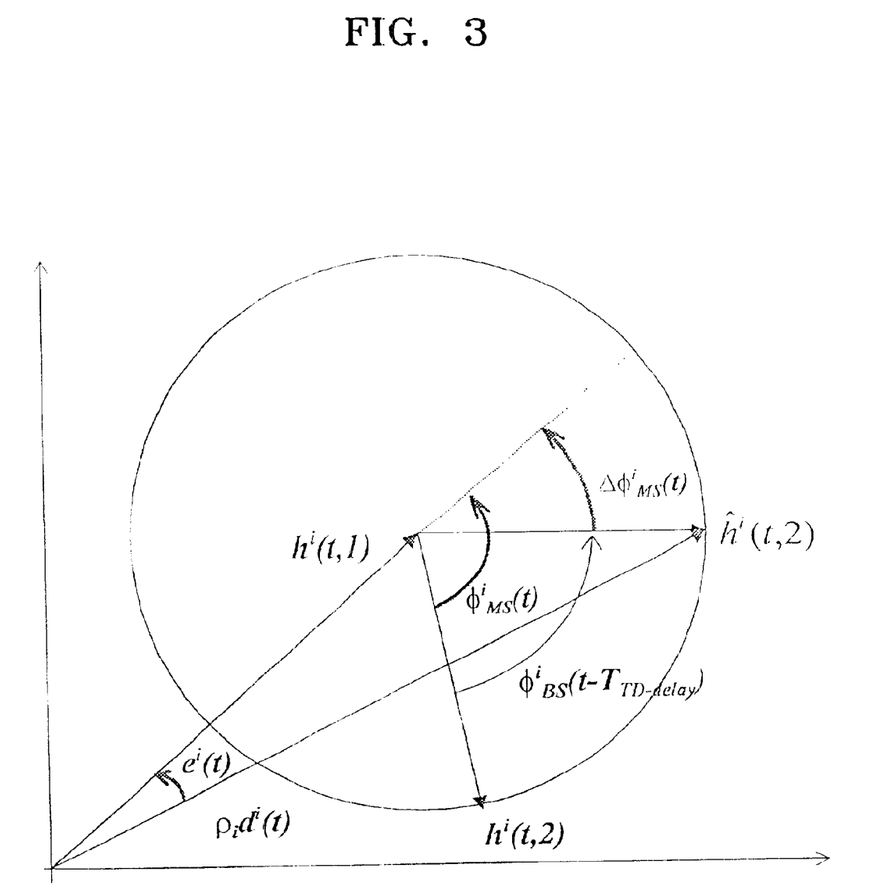
FIG. 3 illustrates the geometrical relationship among channels of each antenna, values to be compensated, and information to be fed back, when two antennas are used.

Now turning to FIG. 3, FIG. 3 illustrates the phase relationship among channels of each antenna, values to be compensated, and information to be fed back, when two antennas are used.

First, FIG. 3 shows the relationship between the first antenna channel information of the i-th mobile station ($h^i$ (t, 1)) and the second antenna channel information of the i-th mobile station ($h^i$ (t, 2)), which have a predetermined phase difference. As shown in FIG. 3, $\hat{h}^i$ (t,2) is the second antenna channel information, which is adjusted to the i-th base station and has the phase difference as much as the changed amount per unit time of the phase difference from the first antenna channel information of the i-th mobile station.

In addition, a mobile station measures channels of the two antennas, which are used in the base station, and a situation in which channels change rapidly can be considered. In order to properly trace changing channels, a mobile station obtains the sign of the changed amount per unit time of the phase difference between antennas, and then sends only the sign to the base station as feedback information, in the present invention.

In order to obtain the sign of the changed amount per unit time of the phase difference between antennas (sgn($\Delta\phi^i_{MS}$) (t)), using a pilot symbol ($d^i(t)$), which is necessarily sent from a base station to every mobile station user, is more efficient than using the above-described $\hat{h}^i$(t,2). FIG. 3 shows that $\hat{h}^i$(t,2) and the pilot symbol ($d^i(t)$) have the same sign. Referring to FIG. 3, $\rho_i$, which the pilot signal is multiplied by, is a value inversely proportional to the change in magnitude due to power control of the i-th mobile station.

Here, the pilot symbol ($d^i(t)$) is originally used for transmission link power control and coherent demodulation. By using the pilot symbol ($d^i$ (t)), the base station does not need to transmit additional information with which each mobile station user measures $\hat{h}^i$ (t,2). This is an advantage of the present invention. When additional information is sent via downlink, transmission diversity gain, which increases downlink capacity, is reduced. However, by using the pilot symbol ($d^i(t)$), which is necessarily used anyway, downlink capacity can be further increased, because additional information for measuring $\hat{h}^i$ (t,2) as well as $\hat{h}^i$ (t,1) is not needed. A pilot symbol for measuring an antenna channel requires about 10% of the channel capacity. The sign of the changed amount per unit time of the phase difference between antennas (sgn($\Delta\phi^i_{MS}(t)$) is expressed as the following equation 4.

$$sgn(\Delta\phi^i_{MS}(t))=sgn\{angle(d^i(t)conj(h^i(t, 1)))\} \quad (4)$$

But, in y=angle(x), the phase of x is adjusted by a value which satisfies $-\pi < y \leq \pi$.

Referring to FIG. 2 again, after the step 210, the base station receives and interprets the feedback information in step 220. The base station receives the changed amount per unit time of the phase difference between antennas, as feedback information, through uplink from a mobile station. Here, the changed amount per unit time of the phase difference between antennas, which is interpreted in the base station, is $\Delta\phi^i_{BS}(t)=\Delta\phi^i_{MS}(t)+n^i(t)$, where $n^i(t)$ is a feedback error by uplink channel noise.

After the step 220, using interpreted feedback information, the weighted value of array antennas for each antenna is calculated in step 230. Using the changed amount per unit time of the phase difference between antennas, the base station calculates the current phase difference between antennas from the following equation 5.

$$\phi^i_{BS}(t)=\phi^i_{BS}(t-T_{TD-delay})+\mu_i\Delta\phi^i_{BS}(t) \quad (5)$$

After storing the phase difference between antennas $\phi^i_{BS}$ ($t-T_{TD-delay}$) which the base station knows, an accumulator is required for adding the changed amount to the stored value. Here, $\mu_i$ represents the step size of an accumulator. In order to obtain an optimal step size, the base station measures the Doppler frequency of the signals received from respective antennas, and sets a step size in proportion to the measured value. Particularly, when only the sign of the changed amount per unit time of the phase difference between antennas is transmitted from a mobile station to the base station, it is needed to obtain an optimal step size.

In the situation when it is difficult to measure Doppler frequency, the step size is set to $\pi/4$ by default. The value, $\pi/4$, was obtained through experiments, and has shown superior performance regardless of speed. However, as for a very high speed mobile station (about 40 km/h or higher, though it is relative), setting the step size to $\pi/2$ demonstrates superior performance. Therefore, the step size is switched from $\pi/4$ to $\pi/2$, or $\pi/2$ to $\pi/4$ according to changes in speed. Optimizing the step size using a Doppler frequency utilizes the characteristic of interaction between uplink Doppler and downlink Doppler.

From the phase difference between antennas ($\phi^i_{BS}$ (t)), which is obtained from equation 5, the weighted value of array antennas ($exp(j\phi^i_{BS}$ (t))) is obtained. The weighted value of array antennas is a phase compensation value, which is required for compensating the phases of antennas against a base antenna when a plurality of antennas forms an array.

After the step 230, data to be transmitted from the base station to a mobile station is multiplied by the weighted value of the array antennas, which is obtained in the step 230, and then is output through the corresponding antenna in step 240.

So far, a closed-loop transmitting antenna diversity method using a plurality of antennas in a mobile telecommunications system has been explained. When a multipath channel is established between a base station and a mobile station in a CDMA system, a plurality of fingers are used by a mobile station because delay spread due to the multipath is great. In the above-described step 200, a mobile station measures the changed amount per unit time for each multiple route channel by using a plurality of fingers. In order to obtain the optimal changed amount per unit time from thus measured changed amounts per unit time, addition is performed using an eigen method.

To explain briefly, the eigen method is an algorithm in which an eigen vector, which corresponds to the maximum eigenvalue of a channel correlation matrix between antennas $R=H^H \cdot H$, is set to the optimum diversity weighted value. Here, H satisfies H=[$h_1, h_2, \ldots h_K$] and $h_K$ satisfies $h_K=[h_{K,1}, h_{K,2}, \ldots h_{K,L}]^T$. K is the number of antennas, and L is the number of multipath. Details can be obtained by reference to the article "Adaptive Transmitting Antenna Method for Multipath Environments," D. Gerlach, *GlobeCom '94*, pp. 425-29.

In particular, when a base station uses two antennas and a channel is formed via multipath between the base station and a mobile station, the sign of the changed amount per unit time of the phase difference between antennas (sgn($\Delta\phi^i_{MS}$ (t)) can be easily obtained from the following equation 6 using this algorithm.

$$sgn(\Delta\phi^i_{MS}(t)) = sgn\left\{Im\left(\sum_{l=1}^{L} d^{i,j}(t)conj(h^{i,j}(t, l))\right)\right\} \quad (6)$$

Here, multipath is represented by l=1,2, . . . ,L, and L is the maximum number of multipath. When a mobile station needs to use a plurality of fingers corresponding to the multipath, the eigen method can be used for obtaining the sign of the optimal changed amount per unit time. When the eigen method is used, matrix multiplication is not needed, unlike the existing method, and therefore a mobile station can be easily implemented.

So far, the diversity method according to the present invention is explained to be used between a base station and mobile station in a mobile telecommunications system. However, the diversity method can be used between a transmitting station and a mobile station in a wireless telecommunication system, which is clear to a person of ordinary skill in the art.

Figure 4:
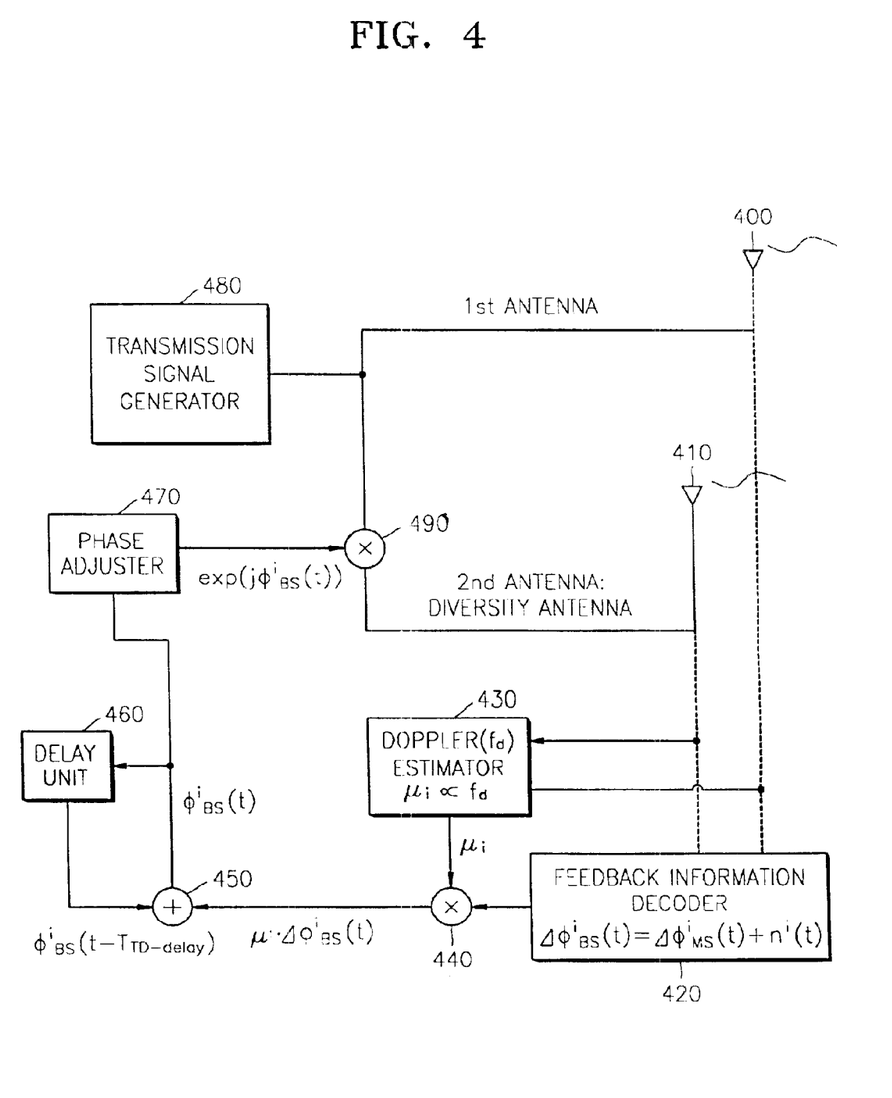
FIG. 4 is a block diagram of a preferable embodiment of a base station apparatus according to the present invention for transmission antenna diversity.

FIG. 4 is a block diagram of a base station apparatus according to the present invention for transmitting antenna diversity, and an example of an apparatus having two antennas.

The base station apparatus in FIG. 4 has a first antenna 400 and a second antenna 410, a feedback information decoder 420, a Doppler estimator 430, a first multiplier 440, an adder 450, a delay unit 460, a phase adjuster 470, a transmitting signal generator 480, and a second multiplier 490.

Feedback information, which is generated from any i-th mobile station, is received through a first antenna 400 and/or a second antenna 410. A feedback information decoder 420 interprets received feedback information and detects the changed amount per unit time of the phase difference between antennas ($\Delta\phi^i_{BS}(t)$). Here, the changed amount per unit time of the phase difference between antennas ($\Delta\phi^i_{BS}(t)$), which is detected in the base station, is expressed as $\Delta\phi^i_{BS}(t) = \Delta\phi^i_{MS}(t) + n^i(t)$. A Doppler estimator 430 calculates the optimum step size ($\mu_i$), using signals received from the first antenna 400 and the second antenna 410. When it is difficult or impossible to measure the step size, $\pi/4$ is the default output. When the step size is set to $\pi/4$, the result is generally superior to that of previous methods. However, for a very high speed mobile station (about 40 km/h or higher, though it is relative), setting the step size to $\pi/2$ demonstrates more superior performance. To utilize this, the Doppler estimator 430 includes a switch (not shown in the drawing), which can switch the step size from $\pi/4$ to $\pi/2$, or from $\pi/2$ to $\pi/4$ in accordance with speed changes.

The first multiplier 440 outputs $\mu_i \cdot \Delta\phi^i_{BS}(t)$ by multiplying the changed amount per unit time of the phase difference between antennas ($\Delta\phi^i_{BS}(t)$) by the optimum step size ($\mu_i$). The adder 450 outputs the phase difference per unit time between antennas ($\phi^i_{BS}(t)$), by adding $\mu_i \cdot \Delta\phi^i_{BS}(t)$ to the output of the delay unit 460, which is $\Delta\phi^i_{BS}(t-T_{TD-delay})$, the phase difference between antennas after delaying a predetermined time ($T_{TD-delay}$). The phase adjuster 470 outputs the weighted value of antennas ($\exp(j\phi^i_{BS}(t))$) for compensating the phase of the second antenna based on the phase difference between antennas ($\phi^i_{BS}(t)$).

The transmitting signal generator 480 generates and outputs a data signal to be transmitted to the first antenna 400 and the second multiplier 490. In addition, a generated pilot signal is output to the first antenna 400. The data signal and pilot signal transmitted to the first antenna 400 are modulated orthogonally with time, frequency, or code. The second multiplier 490 outputs the result of multiplication to the second antenna 410, after multiplying the data signal to be transmitted by the weighted value of antennas ($\exp(j\phi^i_{BS}(t))$). The first antenna 400 transmits the data signal and the pilot signal and the second antenna 410 transmits the output signal of the second multiplier 490.

Figure 5:
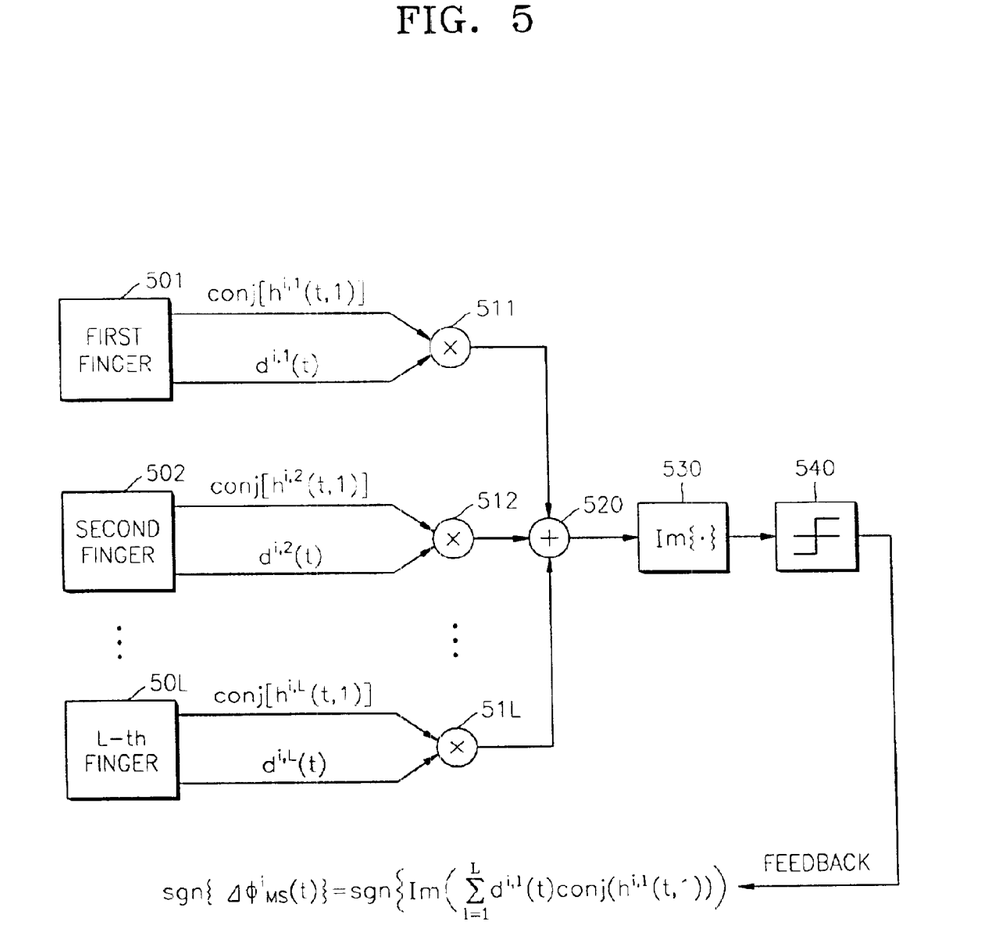
FIG. 5 is a block diagram of a preferred embodiment of a mobile station apparatus according to the present invention for transmission antenna diversity.

FIG. 5 is a block diagram of a mobile station apparatus for generating feedback information in order to adjust transmitting antenna diversity according to the present invention, and the example is a case where a plurality of fingers are used because delay spread due to multipath in a CDMA system is great.

The CDMA mobile station apparatus of FIG. 5 includes fingers 501 through 50L, multipliers 511 through 51L, an adder 520, an imaginary number selector 530 and a determiner 540.

Any i-th mobile station according to the present invention transmits the changed amount per unit time of the phase difference between antennas when a plurality of transmitting antennas are used in a base station. However, when two transmitting antennas are used, only the sign of the changed amount, instead of the changed amount per unit time of the phase difference between antennas, is transmitted. This event can accurately trace a changing channel when the channel changes rapidly. By transmitting only the sign, the changed amount can be estimated in a base station, by using a Doppler frequency.

Any i-th mobile station according to the present invention uses a channel and pilot symbol for the first antenna 400, which is a base antenna, in order to output the sign of the changed amount per unit time of the phase difference between antennas.

Specifically, a first finger 501 measures the first multipath channel of the first antenna 400 and then performs conjugation, and receives a first multipath pilot symbol ($d^{i,}_1(t)$) from the first antenna 400. A first multiplier 511 connected to the first finger 501 receives and multiplies the conjugated first multipath channel ($\text{conj}(h^{i,1}(t,1))$) of the first antenna 400 by the first multipath pilot symbol ($d^{i,i}(t)$).

A second finger 502 measures the second multipath channel of the first antenna 400 and then performs conjugation, and receives a second multipath pilot symbol ($d^{i,2}(t)$) from the first antenna 400. A second multiplier 512 connected to the second finger 502 inputs and multiplies the conjugated second multipath channel ($\text{conj}(h^{i,2}(t,1))$) of the first antenna 400 by the second multiple route pilot symbol ($d^{i,2}(t)$).

Likewise, a L-th finger 50L measures the L-th multipath channel of the first antenna 400 and then performs conjugation, and receives an L-th multipath pilot symbol ($d^{i,}_L(t)$) from the first antenna 400. An L-th multiplier 51L connected to the L-th finger 50L inputs and multiplies the conjugated L-th multipath channel ($\text{conj}(h^{i,L}(t,1))$) of the first antenna 400 by the L-th multipath pilot symbol ($d^{i,2}(t)$).

The adder 520, which is commonly connected to each of multipliers 511 through 51L, adds the output signals of the multipliers. An imaginary number selector 530 selects the imaginary part of the conjugate signal, which is the result of the addition in the adder 520, and outputs it. The determiner 540 determines the sign of the signal, which is output from the imaginary number selector 532. The determiner 540 outputs "0" when the sign is positive, and outputs "1" when the sign is negative. The number "0" or "1", which is output from the determiner 540, is transmitted through a feedback channel to the base station as a feedback signal for adjusting transmitting antenna diversity.

As is evident from the above description, the present invention provides several significant advantages. First, the present invention improves the capacity for uplinking and downlinking, which are important in a mobile telecommunications system, over previous methods. Particularly, the effect of noise and interference on power is reduced by more than 25% at a 20 km/h speed compared to another method proposed. When a mobile station transmits feedback information in the same cycle in order to adjust transmitting diversity, the same performance is guaranteed when half the amount of information in the previous method is sent.

Second, when two antennas are used, a pilot signal, which is already necessarily allocated to a mobile station, is used in measuring feedback information, which removes the need for an additional pilot for measuring a diversity antenna channel, and increases the capacity of a downlink, enabling more user information to be transmitted.

Third, when two antennas are used, the sign of the changed amount per unit time of the phase difference between antennas is obtained and transmitted as only 1 bit of feedback information. Thus, measuring channel can be more easily performed as compared to the previous method. In addition, when a multiple route channel is used, an eigen method is used for facilely measuring a channel.

Fourth, it is easier to implement a base station, which optimizes performance in line with changes in a mobile station speed. Unlike the previous method, in which a mode is switched by a method of third-layer message handshaking with a mobile station, the base station apparatus according to the present invention optimizes the size of a step by measuring a Doppler frequency, which provides a superior capacity regardless of the speed change of a mobile station.

What is claimed is:

1. A closed-loop transmitting antenna diversity method having a plurality of antennas in a mobile telecommunications system, the closed-loop transmitting antenna diversity method comprising the steps of:

(a) measuring, in a mobile station, the changed amount per unit time of the phase difference between antennas for each of the plurality of antennas which are used in a base station;

(b) transmitting the results of the measuring performed in step (a) as feedback information for adjusting transmitting antenna diversity to the base station;

(c) receiving and interpreting feedback information in the base station;

(d) calculating the weighted value of array antennas for each antenna, using the interpreted feedback information; and (e) multiplying data, which is to be transmitted from the base station to a mobile station, by the array antenna weighted value, and outputting the result through a corresponding antenna, wherein the changed amount per unit time of the phase difference between antennas is obtained by subtracting the previous phase difference between antennas, which the base station knows, from the phase difference between antennas, which is calculated by a current mobile station.

2. The closed-loop transmitting antenna diversity method as described in claim 1, wherein in step (a), the changed amount per unit time of the phase difference between antennas is measured using a downlink pilot signal, which is divided for respective mobile station users.

3. The closed-loop transmitting antenna diversity method as described in claim 2, wherein, when a multipath channel is used, the changed amounts per unit time of each channel are added to each other using an eigen method in the step (a).

4. The closed-loop transmitting antenna diversity method as described in claim 1, wherein, in step (d), the Doppler frequency of a signal received from each antenna is measured; results of the measuring are applied to the interpreted feedback information; and the array antenna weighted value of each antenna is obtained.

5. A closed-loop transmitting antenna diversity method when two antennas are used in a mobile telecommunications system, the closed-loop transmitting antenna diversity method comprising the steps of:

(a) obtaining, in a mobile station, the sign of the changed amount per unit time of the phase difference between antennas for the two antennas used in a base station;

(b) transmitting the sign obtained in step (a) as feedback information for adjusting transmitting antenna diversity;

(c) receiving and interpreting feedback information in the base station;

(d) calculating the weighted value of array antennas for each antenna, using the interpreted feedback information; and (e) multiplying data, which is to be transmitted from the base station to a mobile station, by the array antenna weighted value, and outputting the result through a corresponding antenna, wherein the changed amount per unit time of the phase difference between antennas is obtained by subtracting the previous phase difference between antennas, which the base station knows, from the phase difference between antennas, which is calculated by a current mobile station.

6. The closed-loop transmitting antenna diversity method as described in claim 5, wherein the step (a) further comprises the sub-steps of:

(1) conjugating a value obtained by measuring the channel of a base antenna among the two antennas, and multiplying the conjugated value by a pilot symbol, which is received by the base antenna;

(2) selecting the imaginary part of the complex number result of the multiplication; and (3) determining the sign of the selected imaginary part and then, outputting a signal which indicates a positive value or a negative value.

7. The closed-loop transmitting antenna diversity method as described in claim 5, wherein the step (a), which is a multipath channel, further comprises the sub-steps:

(1) conjugating all values obtained by measuring from a first multipath channel to an L-th multipath channel (wherein L is an integer greater than 1) of the base antenna among the two antennas, respectively, and multiplying each conjugated value by a corresponding multipath pilot symbol among a first multipath pilot symbol to an L-th multipath pilot symbol from the base station;

(2) adding the results of the multiplication, and selecting the imaginary part of the complex number result of the multiplication; and (3) determining the sign of the selected imaginary part and then, outputting a signal which indicates a positive value or a negative value.

8. The closed-loop transmitting antenna diversity method as described in claim 5, wherein the step (d) further comprises the sub-steps of:

(1) obtaining the optimum step size, by measuring a Doppler frequency in a signal received by the two antennas;

(2) multiplying the interpreted feedback information by the step size;

(3) obtaining the current phase difference between antennas by adding the result of the multiplication to the previous phase difference between antennas which the base station knows; and (4) calculating the weighted value of the array antennas for compensating the antenna phase, from the current phase difference between antennas.

9. The closed-loop transmitting antenna diversity method as described in claim 8, wherein, when it is not easy to measure a Doppler frequency in the sub-step 1 of step (d), the step size is set to π/4 by default, and the step size can switch from π/4 to π/2, or π/2 to π/4 in accordance with speed changes.

10. A closed-loop transmitting antenna diversity method when a plurality of antennas are used in a wireless telecommunications system, the closed-loop transmitting antenna diversity method comprising the steps of:
  (a) measuring, in a receiving station, the changed amount per unit time of the phase difference between antennas for a plurality of antennas used in a transmitting station;
  (b) transmitting to the transmitting station the results of measuring in step (a) as feedback information for adjusting transmitting antenna diversity;
  (c) receiving and interpreting in the transmitting station feedback information;
  (d) calculating the weighted value of array antennas for each antenna, using the interpreted feedback information; and
  (e) multiplying data, which is to be transmitted from the transmitting station to the receiving station, by the array antenna weighted value, and outputting the result through a corresponding antenna,
  wherein the changed amount per unit time of the phase difference between antennas is obtained by subtracting the previous phase difference between antennas, which the transmitting station knows, from the phase difference between antennas, which is calculated by a current receiving station.

11. A base station apparatus for implementing closed-loop transmitting antenna diversity, when two antennas are used in a mobile telecommunications system, the base station comprising:
  first and second antennas, one or both of which receives feedback information generated from any i-th mobile station;
  a feedback information decoder for interpreting the received feedback information and detecting the changed amount per unit time of the phase difference between antennas;
  a weighted value calculating unit for calculating the weighted value of the second antenna, using the changed amount per unit time; and
  a transmitting unit for transmitting a data signal and a pilot signal to the mobile station through the first antenna, and transmitting the result of multiplication through the second antenna, after multiplying the data signal by the array antenna weighted value,
  wherein the changed amount per unit time of the phase difference between antennas is a value obtained by adding the changed amount per unit time of the phase difference between antennas, which is measured as feedback information in the mobile station, to a feedback error due to uplink channel noise.

12. The base station apparatus of claim 11, wherein the weighted value calculating unit further comprises:
  a Doppler measuring unit for measuring a Doppler frequency in a signal received by the first antenna and a second antenna, and calculating the optimum step size in proportion to the result of measuring;
  a first multiplier for multiplying the changed amount per unit time of the phase difference between antennas detected in the feedback decoder by the step size;
  a delay unit for storing the phase difference between antennas, which is delayed for a predetermined time;
  an adder for outputting the phase difference between antennas by adding the output of the first multiplier and the output of the delay unit; and
  a phase adjusting unit for outputting a phase compensating value, which corresponds to the phase difference between antennas, as the weighted value of the second antenna.

13. The base station apparatus of claim 12, wherein the Doppler measuring unit determines the step size to be π/4 by default when it is not easy to measure a Doppler frequency, and includes a switch for switching the step size from π/4 to π/2, or π/2 to π/4 in accordance with speed changes.

14. A mobile station apparatus for implementing closed-loop transmitting antenna diversity when two antennas are used in a base station, the mobile station apparatus comprising:
  a plurality of fingers 1 through L for conjugating each of L multipath channels, from a first multipath channel through an L-th multipath channel, of a base antenna among two antennas, and receiving each multipath pilot symbol, from a first multipath pilot symbol to an L-th multipath pilot symbol, from the base antenna;
  a plurality of multipliers from 1 through L for multiplying the conjugated value by each corresponding pilot symbol;
  an adder for adding the outputs of the plurality of multipliers 1 through L;
  an imaginary number selecting unit for selecting the imaginary part of a complex number signal which is the output from the adder; and
  a determining unit for determining the sign of the selected imaginary part, and outputting a signal indicating a positive value or a negative value as feedback information.

15. The mobile station apparatus of claim 14, wherein the feedback information is delivered to the base station.

16. The mobile station apparatus of claim 14, wherein the feedback information is for adjusting transmitting antenna diversity.

17. The mobile station apparatus of claim 14, wherein the feedback information includes a sign of a changed amount per unit time of a phase difference between the two antennas in the base station.

* * * * *